Figure 1:
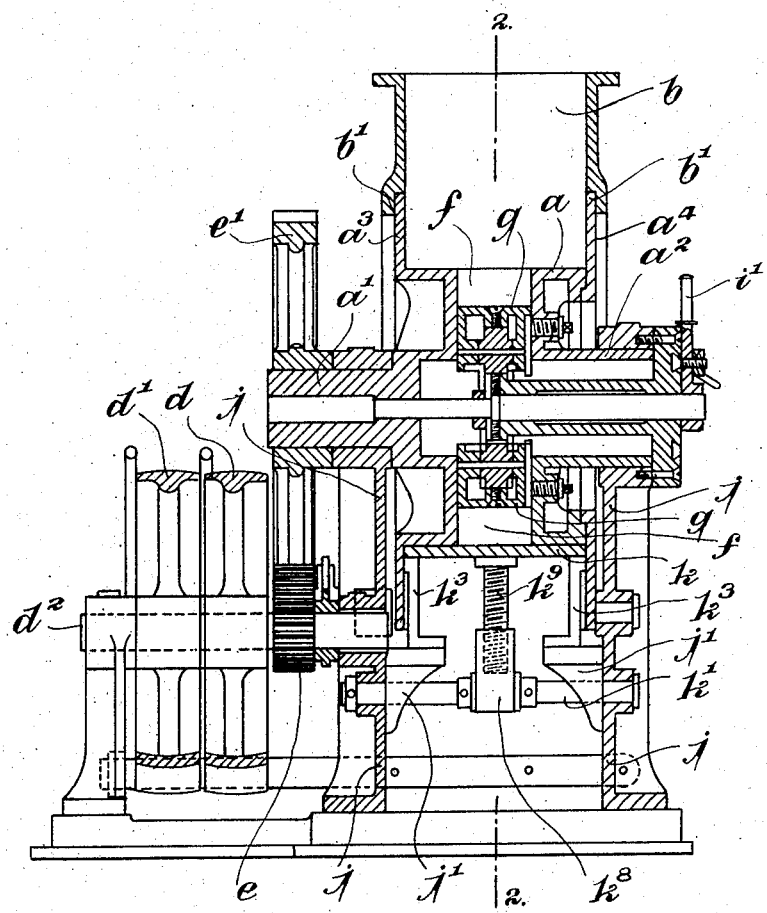

J. WILSON.
MACHINE FOR DIVIDING DOUGH.
APPLICATION FILED JAN. 5, 1910.

1,046,924.

Patented Dec. 10, 1912.
2 SHEETS—SHEET 1.

J. WILSON.
MACHINE FOR DIVIDING DOUGH.
APPLICATION FILED JAN. 5, 1910.
1,046,924.
Patented Dec. 10, 1912.
2 SHEETS—SHEET 2.
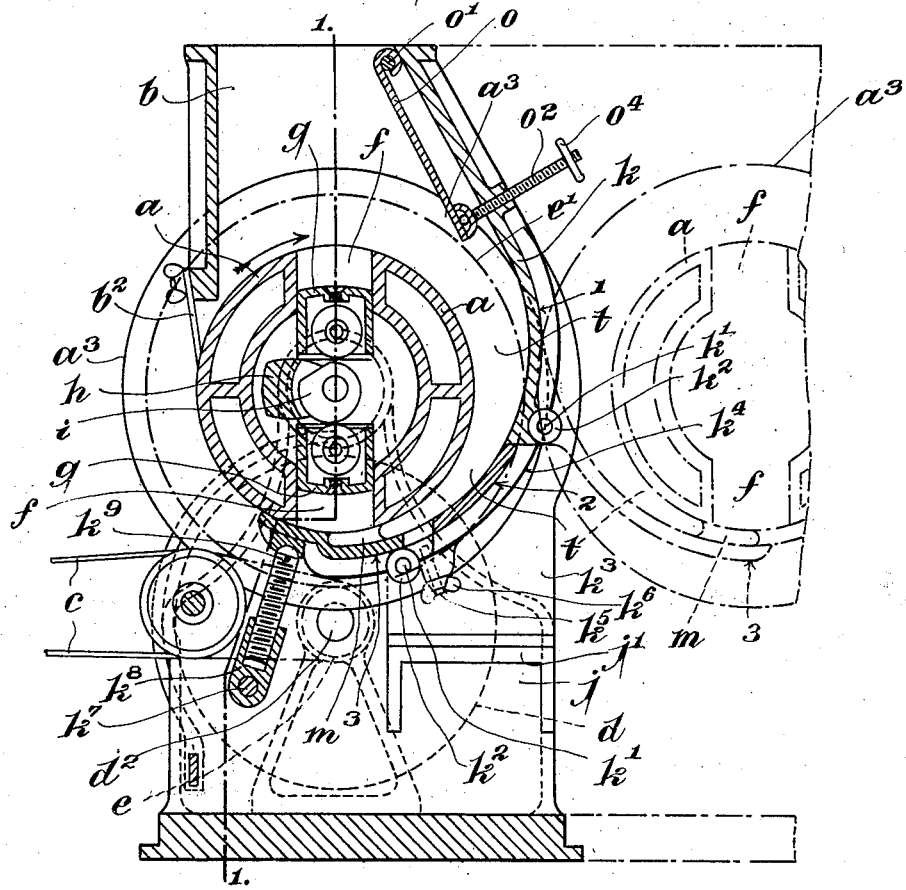

UNITED STATES PATENT OFFICE.

JAMES WILSON, OF GLASGOW, SCOTLAND, ASSIGNOR OF ONE-HALF TO CHARLES GILLESPIE AND DANIEL WILTON, OF GLASGOW, SCOTLAND.

MACHINE FOR DIVIDING DOUGH.

1,046,924. Specification of Letters Patent. Patented Dec. 10, 1912.

Application filed January 5, 1910. Serial No. 536,549.

*To all whom it may concern:*

Be it known that I, JAMES WILSON, a subject of the King of Great Britain, residing at Glasgow, Scotland, have invented a certain new and useful Improved Machine for Dividing Dough, of which the following is a specification.

This invention relates to dough dividing machines of the class wherein the dough is fed from a hopper into cavities in a rotating drum, each of said cavities being provided with a plunger so actuated by a cam as to automatically eject the lumps of dough, which latter fall down on to a conveyer and are removed thereby.

Under this invention a single drum is preferably used and there is a hopper thereover provided with a plate or the like which passes down one side of the drum to the underside thereof, and forms with the surface of the drum, a gradually converging chamber, the said plate being arranged eccentric to the drum, and having, at its lower end, a scraping and cutting arrangement adapted to direct the dough to the cavity being filled; the drum being made with corrugations or flutings on its surface and with circumferential side flanges which may be plain, corrugated, or fluted, so as to assist in the feeding of the dough to and in the said converging chamber.

In order that the invention may be clearly understood we have hereunto appended explanatory drawings which show, by way of illustration or example, one mode of constructing the machine in accordance with the invention, On the said drawings:—Figure 1 is a vertical section taken on the line 1, 1, Fig. 2. Fig. 2 is a vertical section taken on the line 2, 2, Fig. 1. Fig. 3 represents a plan view of a portion of a plate employed in detached position.

In the machine shown on the drawings $a$ is the drum, $b$ the hopper, $c$ the conveyer band which receives the lumps of ejected dough, $d$, $d^1$ the fast and loose pulleys on the driving shaft $i^2$, $e$, $e^1$ gear wheels by means of which the drum is rotated, $f$, $f$, the cavities in the drum $a$, $g$, $g$, the plungers in the cavities, $h$ the stationary cam which operates the plungers, $i$ the cam by means of which the quantity of dough received by the cavities may be varied and $i^1$ the handle by means of which the cam $i$ can be adjusted.

$b^2$ is a scraper.

The drum $a$ is made with a pair of trunnions $a^1$ $a^2$, which work in bearings in the side cheeks or frames $j$, $j$, of the machine, and secured on the trunnion $a^1$ is the gear wheel $e^1$ by means of which the drum is driven, and provided on the drum is a pair of circumferential flanges $a^3$, $a^4$, which are arranged one on each side of the drum and whose outer edges work in recesses $b^1$ provided in the walls of the hopper $b$. One side of this hopper $b$ is extended downward in the form of a curved plate or the like $k$ which forms, with the surface of the drum $a$ and the side flanges $a^3$, $a^4$ thereof a gradually converging packing chamber $t$. The plate $k$ is made with supporting cheeks $k^3$ which are mounted upon the brackets $j^1$ on the side frame $j$ of the machine, and the portion 1 of the plate $k$ is made with a hinged door 2 which preferably extends for only about a half of the width of the plate $k$, the hinge consisting of a bolt or pin $k^1$ passed through snugs $k^2$ on the portion 1 and the door 2. The door 2 is made on its back with a central strengthening web $k^4$ whose lower end is formed with a fork or open slot adapted to receive a screw $k^5$ extending from the back of the plate $k$ and fitted with a thumb screw $k^6$ by means of which the door 2 is locked. Hinged to the lower end of the portion 1 of the plate $k$, by means of a hinge $k^1$, $k^2$ similar to that of the door 2, is a lower portion 3 and on the back of this portion 3 is a depression or recess between which and a cross shaft $k^7$ carried by the side frames $j$ is arranged an extensible device by means of which the portion 3 may be kept in close contact with the surface of the drum $a$, this extensible device consisting preferably of a socket piece $k^8$ mounted on the cross shaft $k^7$ and threaded internally and an externally screwed bolt or pin $k^9$ one end of which engages the portion 3 while the opposite end thereof is received within the socket piece $k^8$. The portion 3 of the curved plate $k$ is made (see plan view Fig. 3) with a pair of angled side scrapers $m$, $m$, and a central cutting-off knife $n$ which work against the surface of the drum. The side scrapers may be so inclined as to direct the dough to the cavity being filled. By means of the door 2 the converging chamber $t$ may be readily cleaned when so desired.

In order to assist in the feeding of the dough to the cavities the surface of the drum is preferably corrugated or fluted while the inner faces of the circumferential flanges $a^3$, $a^4$ may be plain or corrugated or fluted. A central vertical dividing knife may be arranged in the converging chamber $t$ and may extend from the top thereof to the cutting-off knife $n$ at the bottom, or for only part of the way.

In operation, the dough to be divided is supplied to the hopper $b$ and the drum $a$ is rotated by means of the pulley $d$ and gear wheels $e$ $e^1$ in the direction indicated by the arrow at Fig. 2. As the drum $a$ rotates the dough is fed, by the drum, into the converging chamber $t$ where it is packed or subjected to pressure and forced into the cavities $f$. The lumps of dough are ejected from the cavities by the action on the plungers $g$ of the cam $h$ and fall down on to the conveyer band $c$ by means of which they are removed. It will be seen that the machine is self-feeding, the plate $k$ coöperating with the drum to force the dough, at the proper pressure, into the cavities of the drum. As the portion 3, where it bears against the drum, wears away it can be tightened up again by turning the screw $k^9$.

If so desired there may be fitted in the hopper $b$ an adjustable regulator $o$ by means of which the passage of the dough from the hopper to the converging chamber $t$ may be regulated. This regulator consists of a plate $o$ hinged at $o^1$ within the hopper and having connected to it a screwed spindle $o^2$ which passes through a screwed hole in the plate $k$ and is provided at the outside of the hopper $b$ with a hand wheel $o^4$.

It is obvious that the machine may be made double, i. e., with two drums $a$ and a common hopper, the plate $k$ being made double as indicated in dotted lines at Fig. 2 so as to provide a converging packing chamber for each drum. In this case the output would be doubled.

Having now fully described our invention what we claim and desire to secure by Letters Patent is:—

1. A dough dividing machine having, in combination, a rotary drum with cavities therein, a hopper for the dough, a plate permanently secured to the hopper and extending down one side of the drum to the underside thereof so as to form, with the drum, a gradually converging feed chamber, a movable portion on the lower end of said plate and screw means for holding the movable portion in engagement with the underside of the drum.

2. A dough dividing machine having, in combination, a rotary drum with cavities therein, circumferential side flanges on the drum, a hopper recessed to receive said flanges, an extension of the hopper passing down between said flanges, a plate jointed to said extension, a door in said extension and means for closing the door.

3. A dough dividing machine having, in combination, a rotary drum with cavities therein, a hopper for the dough, a plate permanently secured to the hopper and extended down one side of the drum and eccentrically thereof so as to form therewith a gradually converging feed chamber, an extension jointed to the plate and having angled scrapers, and a hinged door in the said plate.

4. A dough dividing machine having, in combination, a rotary drum with cavities therein, a hopper for the dough, a plate permanently secured to the hopper and extended down one side of the drum and eccentrically thereof so as to form therewith a gradually converging feed chamber, an extension jointed to the plate, a hinged door in the plate, means for locking the door, and an adjustable regulator by means of which the passage of the dough from the hopper to the converging feed chamber may be regulated.

5. A dough dividing machine having, in combination, a rotary drum with cavities therein, a hopper for the dough, a plate permanently secured to the hopper and extending down one side of the drum to the underside thereof so as to form, with the drum, a gradually converging feed chamber, a movable portion on the lower end of said plate, a cross shaft arranged beneath the movable portion, an internally threaded socket piece mounted on the cross shaft and an externally threaded pin in engagement with the socket piece and the said movable portion for holding the latter against the underside of the drum.

In testimony whereof I affix my signature in presence of two witnesses.

JAMES WILSON.

Witnesses:
DANIEL WILTON,
SAMUEL BURGESS.

---

Copies of this patent may be obtained for five cents each, by addressing the "Commissioner of Patents, Washington, D. C."